(12) United States Patent
Hösker

(10) Patent No.: US 9,783,250 B2
(45) Date of Patent: Oct. 10, 2017

(54) OVERHEAD CONVEYING APPARATUS FOR MOUNTING ON THE CEILING OF AN ASSEMBLY PLANT

(71) Applicant: Torsten Hösker, Osterburken (DE)

(72) Inventor: Torsten Hösker, Osterburken (DE)

( * ) Notice: Subject to any disclaimer, the term of this patent is extended or adjusted under 35 U.S.C. 154(b) by 0 days.

(21) Appl. No.: 15/022,438

(22) PCT Filed: Aug. 14, 2014

(86) PCT No.: PCT/EP2014/067420
§ 371 (c)(1),
(2) Date: Apr. 20, 2016

(87) PCT Pub. No.: WO2015/043826
PCT Pub. Date: Apr. 2, 2015

(65) Prior Publication Data
US 2016/0221621 A1 Aug. 4, 2016

(30) Foreign Application Priority Data
Sep. 24, 2013 (DE) .................... 20 2013 104 353 U

(51) Int. Cl.
*B65G 17/20* (2006.01)
*B62D 65/18* (2006.01)
*B65G 41/00* (2006.01)

(52) U.S. Cl.
CPC .............. *B62D 65/18* (2013.01); *B65G 17/20* (2013.01); *B65G 41/006* (2013.01)

(58) Field of Classification Search
CPC ................................ B65G 17/20; B62D 65/00
(Continued)

(56) References Cited

U.S. PATENT DOCUMENTS 3,737,964 A * 6/1973 Jury ...................... B21D 47/02
29/6.1
3,792,635 A * 2/1974 Goransson ............ B28B 11/145
83/154
(Continued)

FOREIGN PATENT DOCUMENTS

CN 101704389 A 5/2010
DE 94 16 172 12/1994
(Continued)

OTHER PUBLICATIONS

International Search Report dated Nov. 19, 2014 for International Application No. PCT/EP2014/067420.
(Continued)

*Primary Examiner* — Leslie A Nicholson, III
*Assistant Examiner* — Lester Rushin
(74) *Attorney, Agent, or Firm* — Quarles & Brady LLP

(57) ABSTRACT

The invention relates to an overhead conveying device for integration in an assembly plant in order to transport vehicle components by means of a conveying device arranged on the overhead conveying device that can be mounted at the supporting framework to form a stiff conveying layer. The overhead conveying device is mounted in suspended fashion on the ceiling structure of the assembly plant forming a free space for component assembly and in which it is possible to walk and/or drive. A fastening plane is disposed between the ceiling structure of the assembly plant and the supporting framework and is formed from criss-crossing flexurally stiff steel girders, wherein the steel girders are connected to one another in a load-transmitting fashion at the points of intersection, and wherein the criss-crossing steel girders form a grid of four-sided intermediate zones.

16 Claims, 6 Drawing Sheets

(58) Field of Classification Search
USPC ....... 198/465.4, 678, 381, 686, 860.1, 678.1
See application file for complete search history.

(56) References Cited

U.S. PATENT DOCUMENTS

| | | | | |
|---|---|---|---|---|
| 4,056,907 | A * | 11/1977 | Dolder | E04B 1/24 |
| | | | | 52/266 |
| 4,292,897 | A | 10/1981 | Wakabayashi | |
| 4,936,222 | A | 6/1990 | Murai | |
| 5,226,525 | A | 7/1993 | Dooley | |
| 6,814,219 | B2 | 11/2004 | Shimizu | |
| 7,191,571 | B2 * | 3/2007 | Schools | E04B 2/18 |
| | | | | 52/439 |
| 2004/0011239 | A1 * | 1/2004 | Kawato | B61B 3/00 |
| | | | | 104/172.4 |
| 2004/0020138 | A1 * | 2/2004 | Grearson | E01D 19/106 |
| | | | | 52/64 |
| 2006/0219525 | A1 * | 10/2006 | Dohi | B62D 65/18 |
| | | | | 198/685 |

FOREIGN PATENT DOCUMENTS

| | | |
|---|---|---|
| DE | 198 51 437 | 5/2000 |
| EP | 0 963 904 | 12/1999 |
| JP | 2002096778 A | 4/2002 |
| JP | 2003341818 A | 12/2003 |
| JP | 2005059713 A | 3/2005 |
| WO | 01/38162 | 5/2001 |
| WO | 03/074348 | 9/2003 |
| WO | 2010/038629 | 4/2010 |

OTHER PUBLICATIONS

PCT English Language Translation of the International Preliminary Report on Patentability, PCT/EP2014/067420, dated Apr. 7, 2016.

State Intellectual Property Office of People's Republic of China, First Office Action and Search Report, Application No. 201480052706.0, dated Jun. 1, 2017.

* cited by examiner

OVERHEAD CONVEYING APPARATUS FOR MOUNTING ON THE CEILING OF AN ASSEMBLY PLANT

CROSS-REFERENCE TO RELATED APPLICATIONS

This application represents the national stage entry of PCT International Application No. PCT/EP2014/067420 filed Aug. 14, 2014 and claims priority to German Utility Model Application No. 20 2013 104 353.2 filed Sep. 24, 2013. The contents of this application are hereby incorporated by reference as if set forth in their entirety herein.

The invention relates to an overhead conveying device for integration in an assembly plant, which is suitable for transporting vehicle components.

In assembly plants for manufacturing vehicles, different types of conveying devices as well as of overhead conveying devices are employed. Based on the fact that assembly plants are individually adjusted to each type of vehicle to be manufactured and that the conveying devices are correspondingly configured, the overhead conveying devices under consideration are correspondingly individually designed and manufactured. Here, an overhead conveying device of the type at hand relates to those conveying devices that leave enough free space in which it is possible to walk and/or drive, below the overhead conveying device, to allow suitably moving a person or other conveying vehicles, for instance forklift trucks. Usually, free headroom of at least 2.5 m or more is the aim so that forklift trucks or other transport vehicles are able to cross below the overhead conveying device. Overhead conveying devices of this kind are also employed in order to obtain additional assembly space, wherein, standing on the floor, another conveying device or another kind of assembly plant, such as an assembly robot, may be arranged underneath the overhead conveying device. To integrate overhead conveying devices of this kind into an assembly plant in a building, it is common in the state of the art to put a supporting framework together from steel girders or the like for erecting the actual conveying device on-site in the building, wherein the struts and pillars usually have been welded together on the construction site. This allows for an adaptation to the conditions at hand both with regard to the assembly plants and with regard to the facilities of the building, and assembly plants or building facilities already present can in particular be taken into account.

For a start, the generic overhead conveying device is intended for integration into an assembly plant for transporting vehicle components. The type of the vehicle components is generally without relevance in this case. The substantial feature is that the overhead conveying device is integrated in an assembly concept, making it possible here to manufacture a vehicle by transporting the assigned vehicle parts. For this purpose, the overhead conveying device has a supporting framework and at least one conveying device, for instance a pushing chain conveyor.

Generically speaking, the supporting framework has a length of more than 5 m and a width of more than 2 m. The height at which the supporting framework of the overhead conveying device is affixed above the floor of the designated building is again without general relevance as long as a sufficiently high headroom remains below the supporting framework. The conveying device of the overhead conveying device, for instance a pushing chain conveyor, may be mounted at the supporting framework and allows transporting the corresponding vehicle components, the transport usually taking place along the longitudinal direction of the overhead conveying device.

Furthermore, the supporting framework comprises bearing means, with the help of which the overhead conveying device is mounted in the assembly plant. Here, the bearing of the overhead conveying device has to absorb considerable forces and has to be very stable in order to realize the required tolerances with regard to the accuracy of deposit of the vehicle components moved. Here, the generic overhead conveying device is characterized in that it is not positioned on the floor of the assembly hall, but is hung from the ceiling of the assembly hall. Hence, in other words, this means that the supporting framework and the conveying device have been hung from the ceiling of the building. Because of this, a substantially completely free space can be realized between the underside of the supporting framework and the upper side of the floor of the assembly plant. Columns and gantries for positioning the overhead conveying device, which stand on the floor of the assembly plant themselves, are not needed.

In the known overhead conveying devices for a suspended mounting on the ceiling of a building, it is a considerable disadvantage that the fastening spots on the ceiling usually cannot be selected freely, but go by the edificial conditions of the building. If, for instance, concrete roof bars are present for supporting the hall roof, said concrete roof bars cannot be drilled in at any point in order to fasten the bearing means for fastening the overhead conveying device. Instead, only few fastening spots are commonly available at the concrete roof bars, for instance at the points where the concrete roof bars have clearances anyway. Since the fastening spots on the ceiling of the building hence cannot be selected freely, it is very complex to fix the bearing means, whose position relative to the hall ceiling is predetermined to a large extent, at the overhead conveying device to be fixed below said ceiling. In order to realize the fixation, purpose-made intermediate elements are therefore commonly required, which are to be affixed between, on the one hand, the bearing means on the ceiling of the assembly plant and, on the other hand, the upper side of the overhead conveying device. Here, said intermediate elements, which are manufactured as an individual solution in each instance, have the further disadvantage that they often do not have the necessary stability in order to suitably absorb the dynamic forces arising in the overhead conveying device and to realize the required accuracy of release of the transported vehicle components.

In order to avoid the disadvantages known from the state of the art, it is therefore the object of the present invention to propose a new overhead conveying device.

Said object is attained by an overhead conveying device according to the teaching of claim 1.

Advantageous embodiments of the invention are the subject-matter of the dependent claims.

The basic idea of the overhead conveying device in accordance with the invention is that a fastening plane is disposed between, on the one hand, the bearing means, which is fastened on the ceiling of the assembly plant, and, on the other hand, the supporting framework. Here, the fastening plane is characterized in that it is connected in a load-transmitting fashion to the bearing means, on the one hand, and to the supporting framework, on the other hand, and that it is formed from criss-crossing flexurally stiff steel girders. Here, the steel girders of the fastening plane are connected to one another in a load-transmitting fashion at the points of intersection and form a grid of four-sided intermediate zones. By fitting in the additional fastening plane made up of criss-crossing steel girders, it is achieved that there are standardized transitions for the parts of the overhead conveying device affixed below the same, at which transitions said parts may be fastened to the top in a load-transmitting fashion. In contrast, the fastening plane comprising the steel girders is then in turn fastened on the ceiling of the assembly plant with the help of the bearing means, wherein the exact position of the individual fastening spots on the ceiling is not very relevant anymore. In other words, this means that, by fitting in the additional fastening plane, it is achieved that the fastening spots on the ceiling of the assembly plant, on the one hand, and the fastening spots of the supporting framework, on the other hand, are decoupled. This in particular makes it possible to prefabricate all parts of the overhead conveying device without downright knowing the exact position of fastening spots on the ceiling of the assembly plant. When assembling the overhead conveying device, the bearing means are then initially affixed on the ceiling of the assembly plant and afterwards the fastening plane is fastened to the bearing means, for instance welded to the same, with the steel girders forming the fastening plane. Owing to the correspondingly suitably selected grid of the intermediate plane, it is achieved that the bearing means can be joined to the steel girders of the fastening plane without any problem. As soon as the fastening plane comprising the steel girders then has been fastened in a suspended fashion on the ceiling, the overhead conveying device comprising the conveying device and the supporting framework can be fastened in suspended fashion below the same in a standardized form with defined fastening spots.

The inventive overhead conveying device makes it possible to prefabricate, to a large extent, all parts of the overhead conveying device, regardless of the type of construction of the ceiling. The type of construction of the ceiling can then be taken into account by corresponding bearing means, wherein the position of the individual bearing means on the ceiling can in turn be changed flexibly owing to the inserted fastening plane.

The fastening plane may generally be embodied in any constructive manner. In accordance with a preferred embodiment, it is envisaged that the fastening plane comprises two layers, wherein the first layer comprises several steel girders running in a parallel fashion relative to one another in the longitudinal direction, and wherein the second layer comprises several steel girders running in a parallel fashion relative to one another, wherein the steel girders of the first plane run in the transverse direction relative to the steel girders of the second plane. In particular, the steel girders of the adjacent planes may be arranged so as to run at an angle of 90° relative to one another, such that a grid of rectangular intermediate zones is formed.

In accordance with a further preferred embodiment, it is envisaged that the steel girders, which run in a parallel fashion relative to one another, in the first layer and/or in the second layer, are arranged so as to be equidistant relative to one another in each instance. Because of this, in particular a grid of square intermediate zones may be formed.

The length of steel girders available for commercial applications is limited. In order to still be able to form a fastening plane with ultimately arbitrary dimensions, it is envisaged in accordance with another embodiment that the steel girders in the two layers are put together from several steel girder portions, wherein the individual steel girders are arranged one behind the other in the direction of their longitudinal axis and are connected to one another in a flexurally stiff fashion in the joint area. In particular, the individual steel girders can be welded together in the joint area. As a result, an extraordinary stiff fastening plane thus results, to which the parts of the overhead conveying device suspended below the same can be fastened with a high stability.

Regardless of the arrangement of the individual steel girders, it is, at any rate, particularly advantageous if the steel girders of the two layers in the fastening plane form a grid of rectangular, in particular square, intermediate zones.

The connection between the bearing means on the one hand and the steel girders of the fastening plane on the other hand can again exhibit any type of construction. In order to realize a connection that can be manufactured particularly simply and that is particularly stiff, it is envisaged in accordance with a preferred embodiment that the bearing means have been welded to the steel girders of the fastening plane.

The bearing means for connecting the overhead conveying device to the ceiling of the building of the assembly plant can generally be of any type. Bearing means that can be hooked into the ceiling structure of the assembly plant with a crosshead have proven to be particularly suitable. By hooking in the crossheads, for instance into apertures of concrete roof bars, a very high load absorption capacity can be achieved.

In order to improve the dynamic stability of the overhead conveying device, it is particularly advantageous if the bearing means are interlocked at the ceiling structure of the assembly plant in a frictional fashion. Owing to the friction fit, an absolute fixed point can be realized in a simple manner, which reliably excludes undesired shifts of the bearing means relative to the ceiling, even in case of higher loads. For applying the necessary forces in the frictional connection between the bearing means and the ceiling structure, the parts of the bearing means can be welded together upon fastening to the ceiling structure after the crosshead has been hooked in. Owing to the shrinkage of the parts after welding, the crosshead is interlocked against the ceiling structure with high forces and thus the desired friction fit is realized, with a high contact pressure.

Regarding work safety, it is frequently required to affix a safety floor below the overhead conveying device, in order to realize, in particular, protection against parts falling down, for instance vehicle body components. The inventive structure facilitates affixing of such a safety floor in that corresponding fastening elements may be affixed to the steel girders of the fastening plane and/or to the supporting framework, for instance by welded connections. Owing to the planar safety floor, a high protective effect is, on the one hand, guaranteed here and, on the other hand, the complete plant is mechanically stiffened by the additional fastening elements for fastening the safety floor.

In order to facilitate the assembly of the inventive overhead conveying device, it is particularly advantageous if the supporting framework is designed so as to be self-supporting and can be transported in preassembled form. In this manner, the supporting framework can be preassembled at the manufacturer's. The preassembled subcomponents of the supporting framework can then be transported to the users, for instance by a transport in containers. Setting up of the plant at the user's is considerably facilitated owing to the preassembled parts of the supporting framework.

The preassembled supporting framework can again have generally any constructive embodiment. In order to guarantee sufficient mechanical stability, the supporting framework should comprise at least two side parts, which extend in a parallel fashion relative to the longitudinal axis of the supporting framework and have high stiffness in their component plane.

The conveying devices of the inventive overhead conveying device, which are, for instance, embodied as pushing chain conveyors, may advantageously be mounted between the side parts of two adjacent supporting frameworks.

At generic overhead conveying devices, it is frequently necessary to dispose a maintenance walkway in order to make it possible for operating personnel to carry out maintenance work at the plant. This applies in particular since the generic overhead conveying devices are arranged in suspended fashion on the ceiling of the assembly hall and maintenance work thus cannot be carried out in the usual manner from the floor of the assembly hall. Said maintenance walkways may, at the inventive overhead conveying device, preferably be realized in the supporting framework, along the longitudinal side of the conveying devices.

In order to realize a high mechanical stability while the weight is relatively low, it is particularly advantageous if the supporting framework is designed in the manner of a spatial truss, which comprises longitudinally and transversely oriented and diagonally interconnected and upright interconnected supporting beam elements. Owing to such a truss structure made up of supporting beam elements, for instance steel profiles, a very high stability is realized while the weight is relatively low.

A further augmentation in the mechanical stability may be realized if the supporting beam elements of the supporting framework have a closed tubular cross-section.

Regarding the manufacturing costs and the mechanical stability, it is particularly advantageous if the supporting framework is formed by a welded structure.

One embodiment of the invention is illustrated as an example in the drawings and will be explained in the following.

Figure 1:
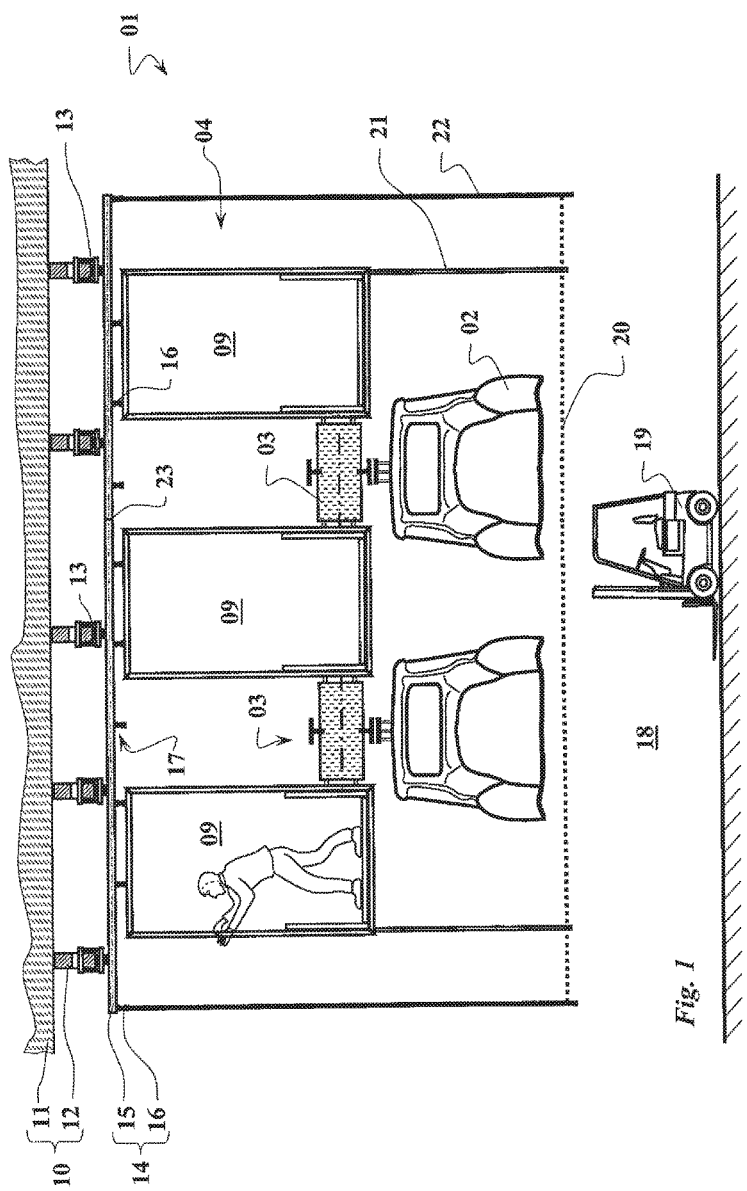
FIG. 1 shows an inventive overhead conveying device in a schematized side view.

FIG. 1 shows an overhead conveying device 01 for integration in an assembly plant in order to transport vehicle components 02, for instance body shells. Here, the vehicle components are transported with the help of conveying devices 03, for instance chain accumulating conveyors. In order to guarantee sufficient mechanical stability of the overhead conveying device 01 even in case of dynamic loads and to be able to comply with the necessary transfer tolerances when transferring the vehicle components 02 to downstream parts of the assembly plants, for instance when transferring to handling robots, the overhead conveying device 01 is furnished with supporting frameworks 04. Here, each supporting framework 04 consists of several frame elements 05, which are arranged one behind the other in the conveying direction with their open cross-section, and of side parts 06, 07 and 08 fastened in the frame elements 05. The side parts 06, 07 and 08 form a spatial truss and will be explained in even greater detail in the following (see description on FIG. 8). Each of the conveying devices 03 is fastened between the side parts 06 and 07 of adjacent supporting frameworks 04. Each supporting framework 04 forms a maintenance walkway 09, in which the operating personnel 10 may move safely parallel to the conveying devices 03. The complete overhead conveying device 01 is envisaged to be fastened in suspended fashion on a ceiling structure 10. Here, the actual roof 11 rests on concrete struts 12. In order to be able to fasten the overhead conveying device 01 to the concrete struts 12, bearing means 13 are hooked into the clearances in the concrete struts 12 with their respective crosshead 14 and are welded to a roof bar from below. In this manner, a stable friction fit is realized between the bearing means 13 on the one hand and the concrete struts 12 on the other hand.

In order to be able to fix the supporting frameworks 04 to the concrete struts 12 and to the bearing means 13 fastened thereto, in a simple manner, a fastening plane 14 is disposed in accordance with the invention, which has been formed from criss-crossing flexurally stiff steel girders 15 and 16. The steel girders 15 and 16 are connected to one another, namely welded together, in load-transmitting fashion at the points of intersection 17 and form a grid of four-sided, namely rectangular, intermediate zones 25. The bearing means 13 is a fastener that can fix the fastening plane 14 to ceiling structure of the assembly plant.

Owing to the suspended fastening of the supporting frameworks 04 and of the conveying devices 03 fastened thereto, a free space 18, in which it is possible to walk and drive, is formed below the overhead conveying device 01. In the free space 18, assembly devices, for instance handling robots, may be erected or the free space 18 may be used for transporting goods by way of conveying apparatuses, for instance forklift trucks 19. In order to realize sufficient protection against accidents caused by parts that fall down, a safety floor 20 is fastened above the free space 18 and below the overhead conveying device 01. The steel struts 21 and 22 envisaged for fastening the safety floor 20 may be welded to the supporting frameworks 04 and to the fastening plane 14.

Figure 2:
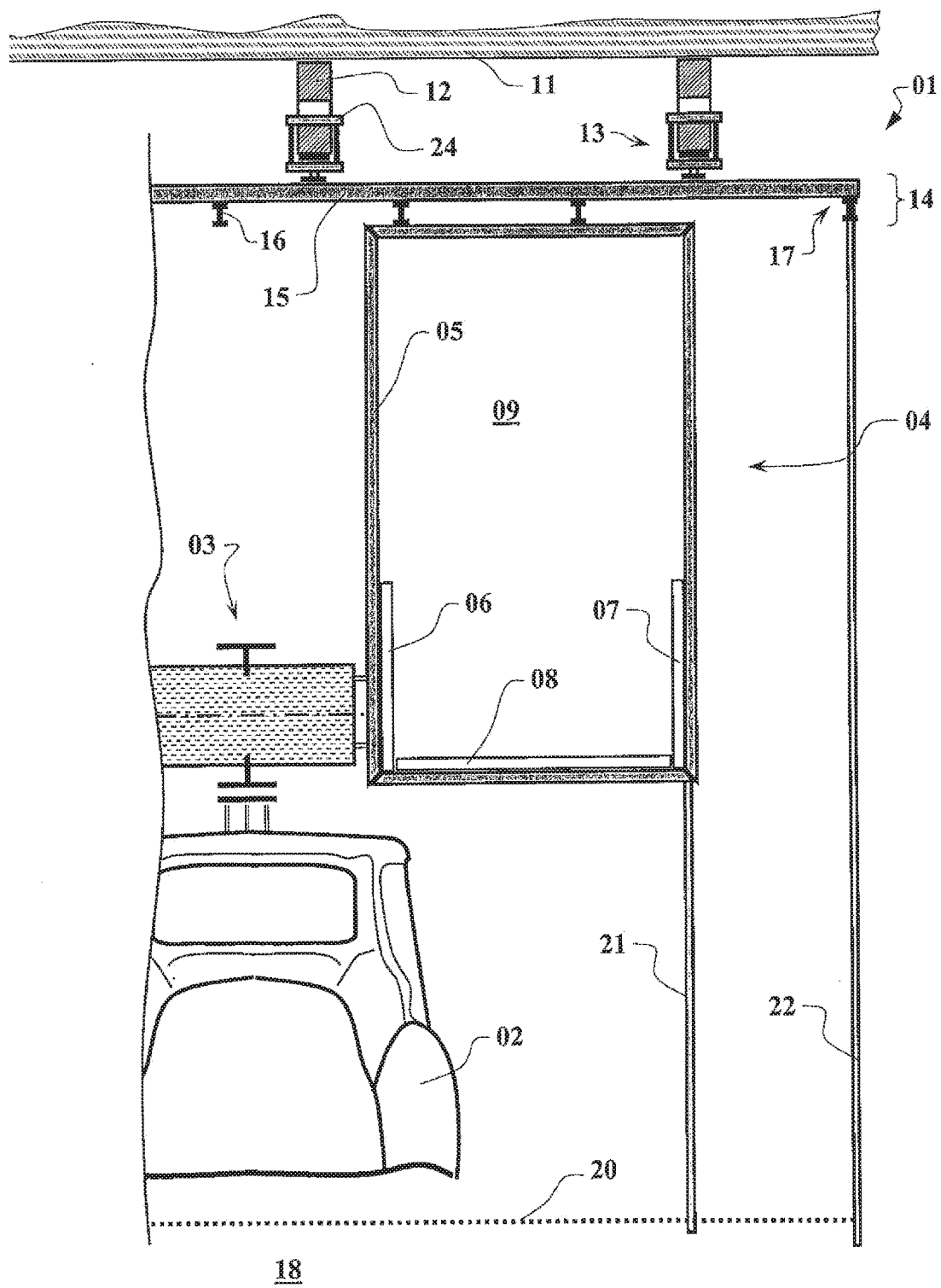
FIG. 2 shows the overhead conveying device in accordance with FIG. 1 in an enlarged cut-out.

FIG. 2 shows the overhead conveying device 01 in an enlarged detail. The bearing means 13 hooked into the concrete struts 12 with the help of the crossheads 14 can be seen.

Figure 3:
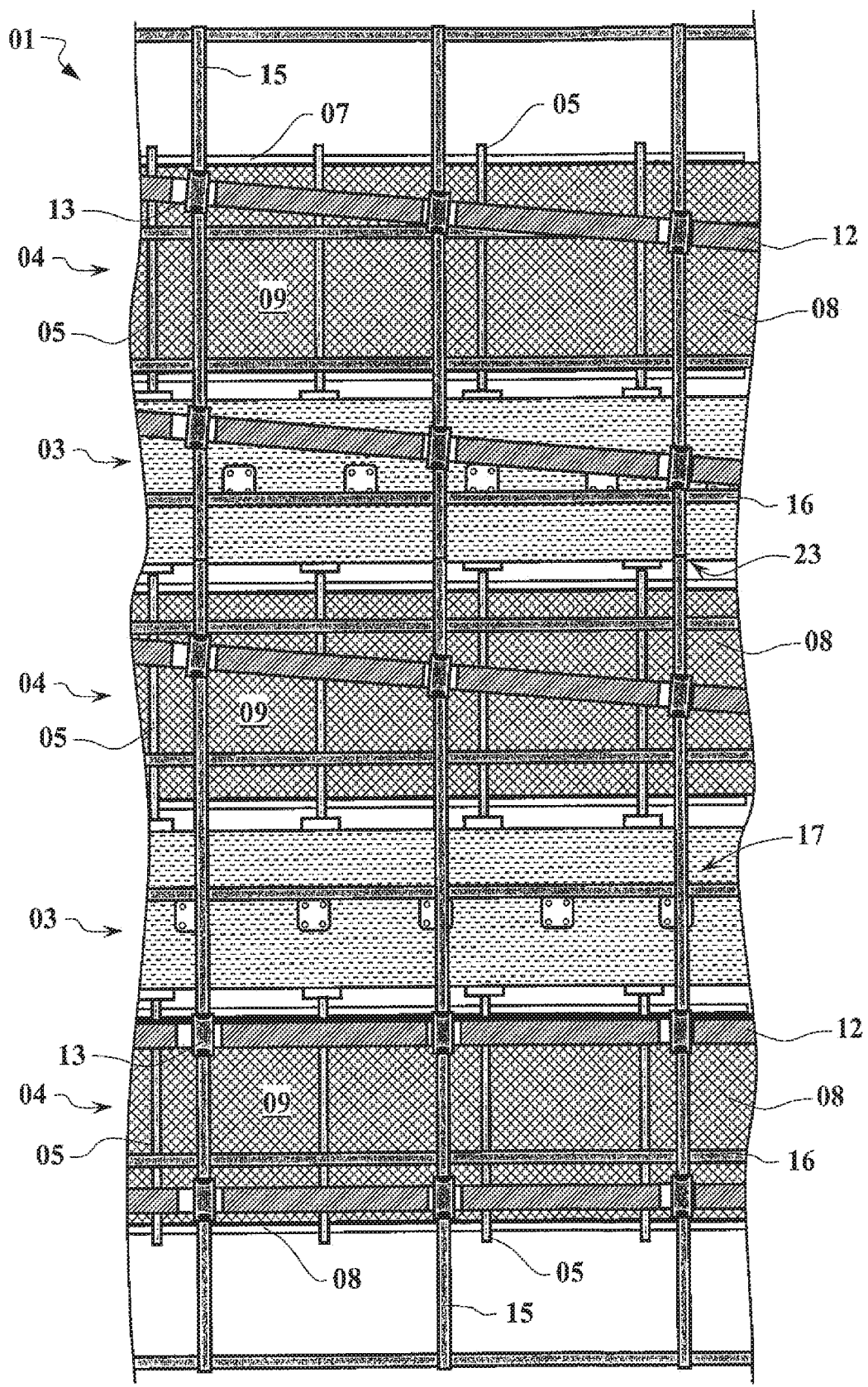
FIG. 3 shows the overhead conveying device in accordance with FIG. 1 in a view from above.

FIG. 3 shows the overhead conveying device 01 in a view from above, wherein the roof 11 is not illustrated in FIG. 3. The concrete struts 12 partially do not run in a parallel fashion relative to one another and partially run at a different distance. In order to nonetheless be able to fasten the overhead conveying device 01 to the ceiling 10 in a simple fashion, the fastening plane 14, consisting of the steel girders 15 and 16, is inserted between the concrete struts 12 and the bearing means 13 fastened thereto, on the one hand, and the supporting frameworks 04, on the other hand. Because of this, it is possible to arrange the position of the bearing means 13 relative to the position of the supporting frameworks 04 in a decoupled fashion relative to one another. It can be seen that the steel girders 15 and 16 of the fastening plane 14 form a grid of rectangular intermediate zones 25, wherein said grid may be fastened by its plurality of points of intersection to the concrete struts 12, on the one hand, and the supporting frameworks 04, on the other hand, in a simple manner.

Figure 4:
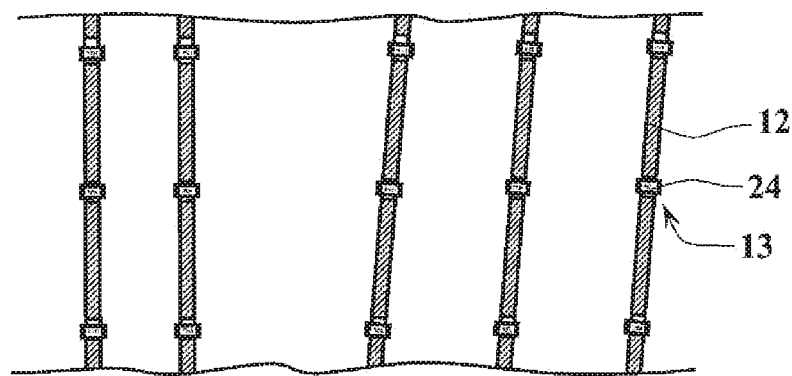
FIG. 4 shows the bearing means fastened on the ceiling structure of the assembly hall and pertaining to the overhead conveying device in accordance with FIG. 3 in a view from above.
Figure 5:
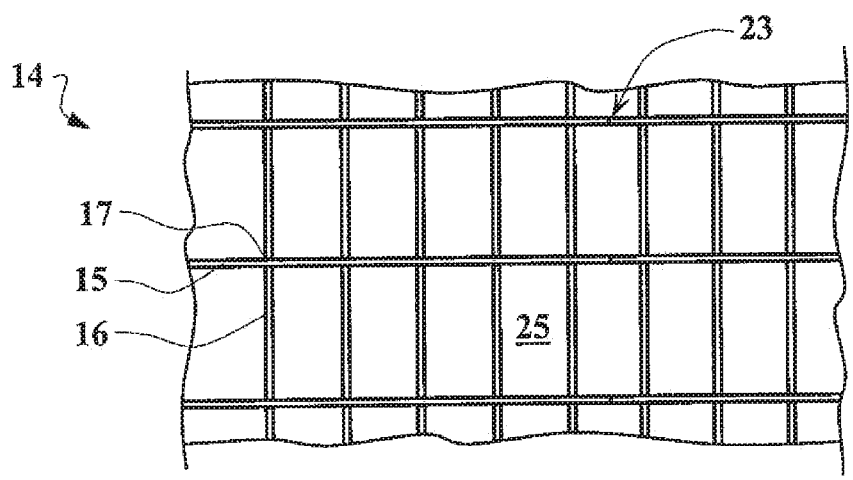
FIG. 5 shows the fastening plane of the overhead conveying device in accordance with FIG. 3 in a view from above.
Figure 6:
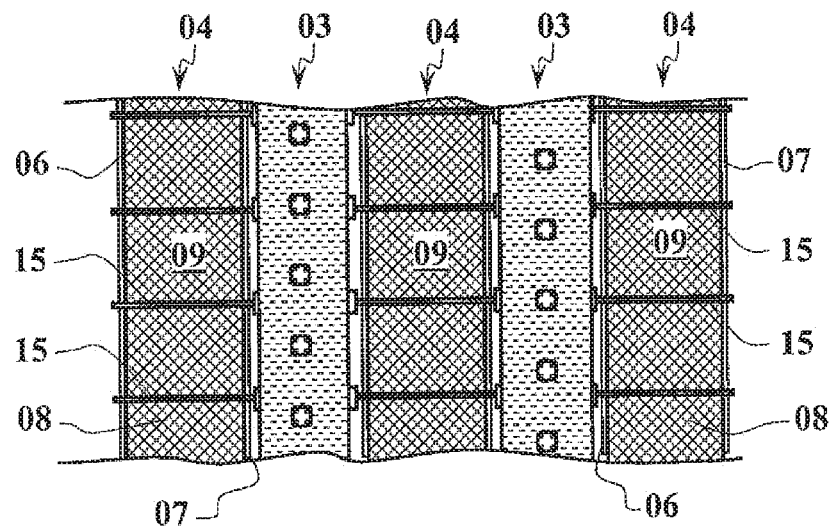
FIG. 6 shows the supporting frameworks and the conveying devices of the overhead conveying device in accordance with FIG. 3 in a view from above.

FIG. 4, FIG. 5 and FIG. 6 show the different parts of the overhead conveying device 01 in a layered form, in each instance in a view from above. FIG. 4 shows the concrete struts 12 having the bearing means 13 fastened thereto. The fastening plane 14 formed from the steel girders 15 and 16 is suspended beneath the bearing means 13. FIG. 5 shows the steel girders 15 and 16. In joint areas 23, steel girder portions have been welded together in order to thus ultimately form steel girders 15 and 16 with the necessary length. FIG. 6 shows the supporting frameworks 04 having the two conveying devices 03 which are arranged therebetween, and which are suspended from the fastening plane 14.

Figure 7:
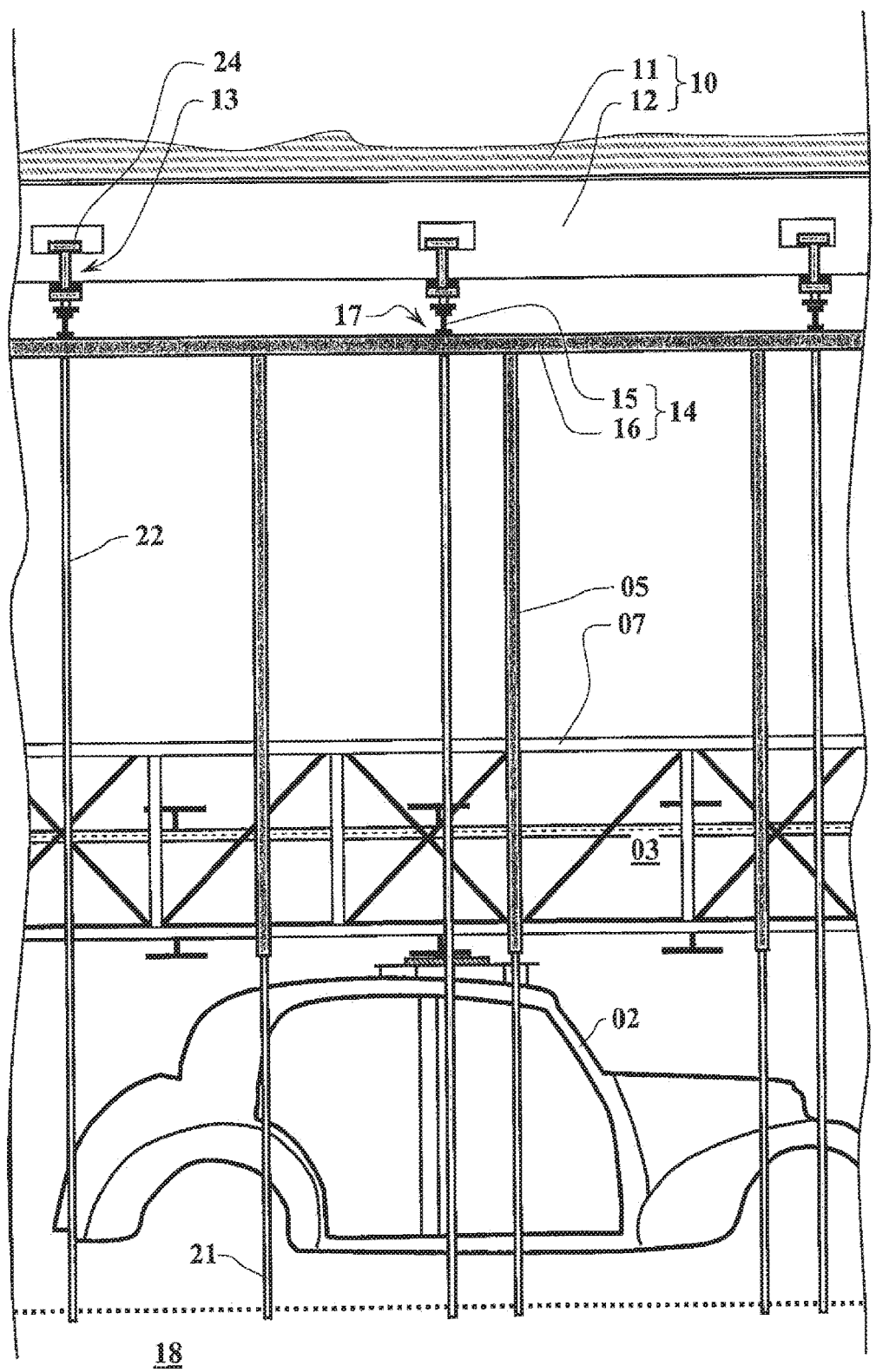
FIG. 7 shows the overhead conveying device in accordance with FIG. 1 in a side view.

FIG. 7 shows the overhead conveying device 01 in a side view. The frames 05 pertaining to the supporting frameworks 04 and being arranged one behind the other can be seen, said supporting frameworks being fastened to the underside of the steel girders 16 in each instance. In the frames 05, the side parts 06, 07 and 08, which are embodied in the manner of truss structures, are held, wherein welded connections are in each instance present between the frames 05 and the side parts 06, 07 and 08, in order to reinforce the overhead conveying device 01.

Figure 8:
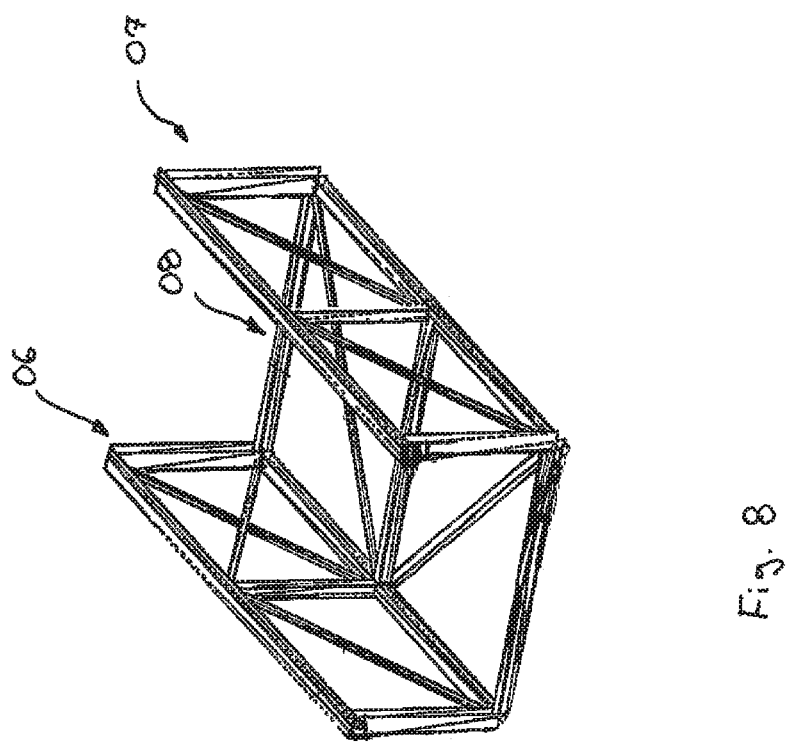
FIG. 8 shows a module of the supporting framework of the overhead conveying device in accordance with FIG. 1, said module being manufactured in the manner of a truss, in a perspective view.

FIG. 8 shows the side parts 06, 07 and 08 in a perspective view. The side parts 06, 07 and 08 can be transported and incorporated as prefabricated modules, as it is illustrated in FIG. 8.

The invention claimed is:

1. An overhead conveying device for integration in an assembly plant in order to transport vehicle components, said overhead conveying device comprising:
   supporting framework having a length of more than 5 m and a width of more than 2 m;
   a conveyor mounted at the supporting framework, wherein the supporting framework and the conveyor form a stiff conveying layer, in or at which vehicle components can be transported from an input point to an output point;
   fasteners for fixing the overhead conveying device in suspended fashion, on ceiling structure of the assembly plant, and wherein the overhead conveying device suspended from the ceiling structure of the assembly plant by the fasteners forms a free space between an underside of the supporting framework and an upper side of a floor of the assembly plant suitable for component assembly and/or for component transport and in which it is possible to walk and/or drive; and
   a fastening plane disposed between the fasteners and the supporting framework, wherein the fastening plane is connected in a load-transmitting fashion to the fasteners and the supporting framework, and wherein the fastening plane is formed from criss-crossing flexurally stiff steel girders, wherein the steel girders are connected to one another in a load-transmitting fashion at points of intersection, and wherein the criss-crossing steel girders form a grid of four-sided intermediate zones.

2. The overhead conveying device according to claim 1, in which the fastening plane includes a first layer and a second layer, wherein the first layer includes several steel girders running substantially parallel relative to one another in a longitudinal direction, and wherein the second layer includes several steel girders running substantially parallel relative to one another in a transverse direction.

3. The overhead conveying device according to claim 2, in which the substantially parallel steel girders are arranged so as to be equidistant relative to one another.

4. The overhead conveying device according to claim 1, in which the steel girders include several steel girder portions arranged one behind the other in a direction of a longitudinal axis and are connected at joints to one another in a flexurally stiff fashion.

5. The overhead conveying device according to claim 1, in which the grid of four-sided intermediate zones is a grid of rectangular intermediate zones.

6. The overhead conveying device according to claim 1, in which the fasteners are welded to the steel girders of the fastening plane.

7. The overhead conveying device according to claim 1, in which each of the fasteners is hooked into the ceiling structure of the assembly plant with a crosshead.

8. The overhead conveying device according to claim 1, in which the fasteners are frictionally interlocked at the ceiling structure of the assembly plant.

9. The overhead conveying device according to claim 1, including a safety floor hung from the steel girders of the fastening plane and/or from the supporting framework, said safety floor extending in the entire area below the conveyor and above the free space.

10. The overhead conveying device according to claim 1, in which parts of the supporting framework are self-supporting and transportable in preassembled form.

11. The overhead conveying device according to claim 10, in which the supporting framework includes at least two side parts which are self-supporting and extend substantially parallel relative to a longitudinal axis of the supporting framework.

12. The overhead conveying device according to claim 11, in which the conveyor is arranged between the side parts of two adjacent supporting frameworks.

13. The overhead conveying device according to claim 1, including a maintenance walkway in the supporting framework along a longitudinal side of the conveyor.

14. The overhead conveying device according to claim 1, in which the supporting framework is, at least partially, a spatial truss, and includes longitudinally and transversely oriented and diagonal and upright interconnected supporting beam elements.

15. The overhead conveying device according to claim 14, in which the supporting beam elements have a closed tubular cross-section.

16. The overhead conveying device according to claim 1, in which the supporting framework is a welded structure.

* * * * *